US009179355B2

(12) United States Patent
Tabet et al.

(10) Patent No.: US 9,179,355 B2
(45) Date of Patent: Nov. 3, 2015

(54) CELL UTILIZATION ESTIMATION BY A WIRELESS DEVICE

(71) Applicant: Apple Inc., Cupertino, CA (US)

(72) Inventors: Tarik Tabet, Los Gatos, CA (US); Sarma V Vangala, San Jose, CA (US); Samy Khay-Ibbat, San Francisco, CA (US); Swaminathan Balakrishnan, Los Gatos, CA (US); Ajoy K Singh, Milpitas, CA (US); Sree Ram Kodali, Sunnyvale, CA (US); Rafael Rivera-Barreto, Santa Clara, CA (US); S Aon Mujtaba, Santa Clara, CA (US); Faraz Faheem, Santa Clara, CA (US); Sreevalsan Vallath, Dublin, CA (US)

(73) Assignee: Apple Inc., Cupertino, CA (US)

( * ) Notice: Subject to any disclaimer, the term of this patent is extended or adjusted under 35 U.S.C. 154(b) by 80 days.

(21) Appl. No.: 14/150,928

(22) Filed: Jan. 9, 2014

(65) Prior Publication Data

US 2015/0195737 A1 Jul. 9, 2015

(51) Int. Cl.
*H04M 11/00* (2006.01)
*H04W 28/02* (2009.01)
*H04W 24/08* (2009.01)
*H04W 28/08* (2009.01)
*H04W 72/04* (2009.01)
*H04W 88/02* (2009.01)

(52) U.S. Cl.
CPC .......... *H04W 28/0236* (2013.01); *H04W 24/08* (2013.01); *H04W 28/08* (2013.01); *H04W 72/0486* (2013.01); *H04W 88/02* (2013.01)

(58) Field of Classification Search
CPC . H04W 28/0236; H04W 24/08; H04W 28/08; H04W 72/0486; H04W 88/02
See application file for complete search history.

(56) References Cited

U.S. PATENT DOCUMENTS

| 7,310,526 B2 | 12/2007 | Sang et al. |
| 8,688,112 B2 | 4/2014 | Shen et al. |
| 2013/0040683 A1* | 2/2013 | Siomina et al. ............... 455/517 |
| 2013/0273878 A1* | 10/2013 | HEO et al. ..................... 455/405 |
| 2014/0269313 A1 | 9/2014 | Liu et al. |
| 2014/0334318 A1 | 11/2014 | Pica et al. |

FOREIGN PATENT DOCUMENTS

| EP | 2672773 | 11/2013 |
| WO | 2013191636 | 12/2013 |

* cited by examiner

*Primary Examiner* — Kashif Siddiqui
(74) *Attorney, Agent, or Firm* — Meyertons Hood Kivlin Kowert & Goetzel, P.C.; Jeffrey C. Hood

(57) ABSTRACT

Estimating loading and potential available throughput a serving cell of a wireless user equipment (UE) device. Physical layer metrics of a channel on which the UE communicates with the serving cell may be measured. Cell utilization of the serving cell may be calculated based at least in part on the measured physical layer metrics. A maximum available throughput of the serving cell may be calculated based on the cell utilization.

20 Claims, 6 Drawing Sheets

CELL UTILIZATION ESTIMATION BY A WIRELESS DEVICE

FIELD

The present disclosure relates to the field of wireless communication, and more particularly to a system and method for a wireless user equipment (UE) device to estimate loading of a cell of a cellular network.

DESCRIPTION OF THE RELATED ART

Wireless communication systems are rapidly growing in usage. Further, wireless communication technology has evolved from voice-only communications to also include the transmission of data, such as Internet and multimedia content. There exist numerous different wireless communication technologies and standards. Some examples of wireless communication standards include GSM, UMTS (WCDMA), LTE, LTE Advanced (LTE-A), 3GPP2 CDMA2000 (e.g., 1×RTT, 1×EV-DO, HRPD, eHRPD), IEEE 802.11 (WLAN or Wi-Fi), IEEE 802.16 (WiMAX), Bluetooth, and others. Some of these standards may serve complementary functions while others may typically be considered competitors attempting to fulfill similar needs amongst consumers.

Cellular networks, in particular, are generally provided by way of various network infrastructure components, typically including numerous base transceiver stations, switches, routers, and various other network infrastructure components. The resulting network may be able to provide cellular communication services to subscribers of that network within a service territory encompassed by the network. At various times, different numbers of subscribers may use services in different portions of such a service territory, cumulatively representing different (localized and overall) network 'loads'. For many networks, network resources are dynamically allocated to subscribers such that relatively fewer network resources are available per-subscriber at times and locations where heavy network loading is occurring (e.g., as those resources are distributed between a larger number of subscribers), while relatively greater network resources are available per-subscriber at times and locations where lighter network loading is occurring (e.g., as there may be less competition for those resources).

Accordingly, network loading may be a significant factor in the performance (e.g., throughput, quality of service, battery performance) of subscribers of a network. However, currently, high-quality information on loading of cellular networks' infrastructure is available only to the operators of those networks (i.e., cellular carriers). Cellular devices subscribed to networks are not themselves identifying or estimating network loads, or being provided with such information by the network operators. Those devices are thus unable to make use of information which significantly affects their performance. Accordingly, improvements in wireless communications would be desirable.

SUMMARY

Embodiments are presented herein of, inter alia, a method for a wireless user equipment (UE) device to estimate the loading on cellular networks, and in particular to estimate the utilization of a serving cell of the UE, and of a device configured to implement the method.

Techniques are described, whereby a UE may measure certain physical layer characteristics of a communication medium by way of which the UE communicates with a serving cell according to a radio access technology, and, on the basis of those measurements, calculate an estimated utilization of a channel or band of the serving cell of the UE. Calculating the estimated utilization of the serving cell of the UE may in turn allow the UE to calculate or estimate how much bandwidth or throughput could be made available to the UE by the serving cell. Such information may be used by the UE in any of a variety of ways, such as to inform decisions relating to various operations in a manner that may improve battery life, throughput, Quality of Service, and/or any of various other operational characteristics.

As one example, consider an application executing on the UE which requires a certain level of throughput to provide an acceptable user experience. If the UE is able to determine (e.g., using the techniques described herein) that a current serving cell will be unable to provide the required level of throughput based on an estimation of the total utilization of the current serving cell which is currently being used as a communication medium between the UE and the serving cell, the UE may be able to pursue alternatives to attempting to utilize the current serving cell for the application. Such alternatives may include re-selecting to a different serving cell (e.g., using the same radio access technology or a different radio access technology) and/or adding an additional carrier on a different band, using a different wireless communication technology (in addition or as an alternative to the wireless communication technology being used between the UE and the serving cell), or halting the application/providing an indication to the application that insufficient throughput is available for its purposes at the present time, among various possibilities.

Note that the techniques described herein may be implemented in and/or used with a number of different types of devices, including but not limited to, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

A better understanding of the present subject matter can be obtained when the following detailed description of the preferred embodiment is considered in conjunction with the following drawings, in which.

Figure 1:
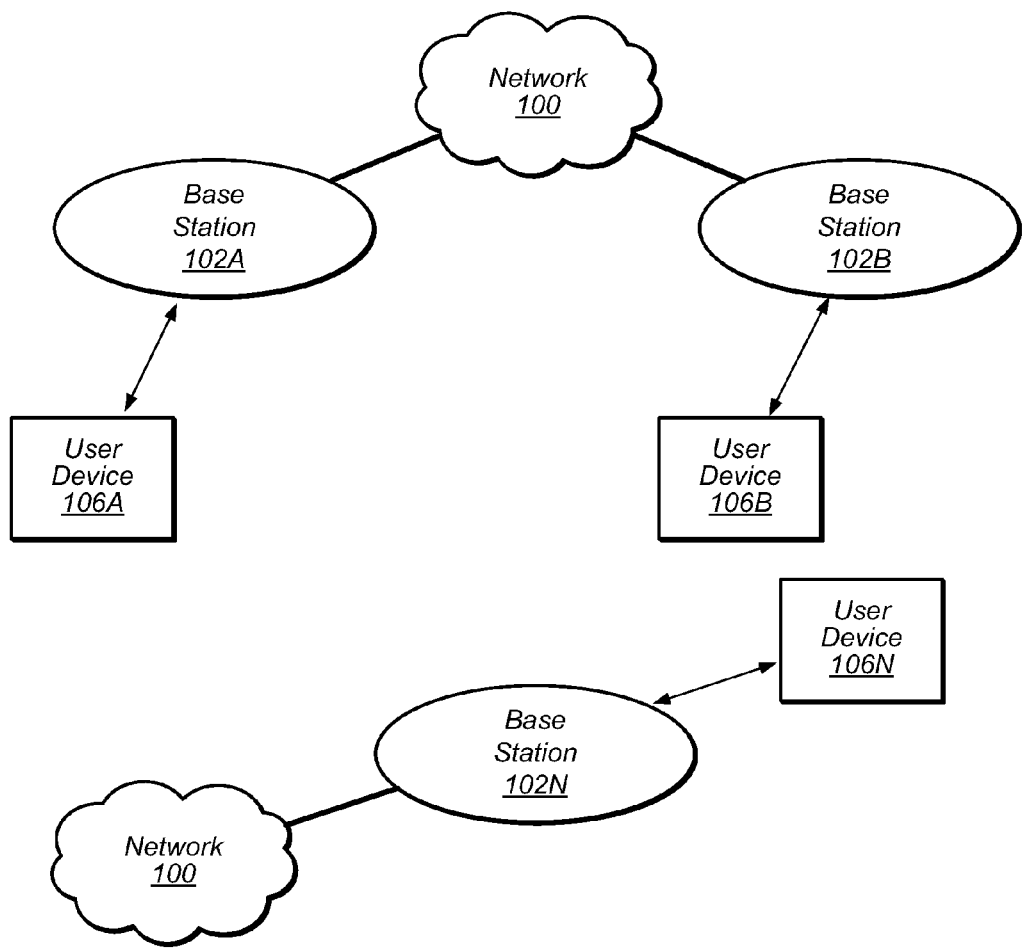
FIG. 1 illustrates an exemplary wireless communication system.

While the features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Terms

The following is a glossary of terms used in the present disclosure:

Memory Medium—Any of various types of non-transitory memory devices or storage devices. The term "memory medium" is intended to include an installation medium, e.g., a CD-ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may include other types of non-transitory memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer for execution. The term "memory medium" may include two or more memory mediums which may reside in different locations, e.g., in different computer systems that are connected over a network. The memory medium may store program instructions (e.g., embodied as computer programs) that may be executed by one or more processors.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Computer System—any of various types of computing or processing systems, including a personal computer system (PC), mainframe computer system, workstation, network appliance, Internet appliance, personal digital assistant (PDA), personal communication device, smart phone, television system, grid computing system, or other device or combinations of devices. In general, the term "computer system" can be broadly defined to encompass any device (or combination of devices) having at least one processor that executes instructions from a memory medium.

User Equipment (UE) (or "UE Device")—any of various types of computer systems devices which are mobile or portable and which performs wireless communications. Examples of UE devices include mobile telephones or smart phones (e.g., iPhone™, Android™-based phones), portable gaming devices (e.g., Nintendo DS™, PlayStation Portable™, Gameboy Advance™, iPhone™), laptops, PDAs, portable Internet devices, music players, data storage devices, or other handheld devices, etc. In general, the term "UE" or "UE device" can be broadly defined to encompass any electronic, computing, and/or telecommunications device (or combination of devices) which is easily transported by a user and capable of wireless communication.

Base Station—The term "Base Station" has the full breadth of its ordinary meaning, and at least includes a wireless communication station installed at a fixed location and used to communicate as part of a wireless telephone system or radio system.

Processing Element—refers to various elements or combinations of elements. Processing elements include, for example, circuits such as an ASIC (Application Specific Integrated Circuit), portions or circuits of individual processor cores, entire processor cores, individual processors, programmable hardware devices such as a field programmable gate array (FPGA), and/or larger portions of systems that include multiple processors.

Channel—a medium used to convey information from a sender (transmitter) to a receiver. It should be noted that since characteristics of the term "channel" may differ according to different wireless protocols, the term "channel" as used herein may be considered as being used in a manner that is consistent with the standard of the type of device with reference to which the term is used. In some standards, channel widths may be variable (e.g., depending on device capability, band conditions, etc.). For example, LTE may support scalable channel bandwidths from 1.4 MHz to 20 MHz. In contrast, WLAN channels may be 22 MHz wide while Bluetooth channels may be 1 Mhz wide. Other protocols and standards may include different definitions of channels. Furthermore, some standards may define and use multiple types of channels, e.g., different channels for uplink or downlink and/or different channels for different uses such as data, control information, etc.

Band—The term "band" has the full breadth of its ordinary meaning, and at least includes a section of spectrum (e.g., radio frequency spectrum) in which channels are used or set aside for the same purpose. Various unlicensed Industrial-Scientific-Medical (ISM) frequency bands may represent one set of examples of bands. Various bands licensed to telecommunication operators (e.g., for use in conjunction with one or more cellular communication technologies) represent another set of examples of bands.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Figure 2:
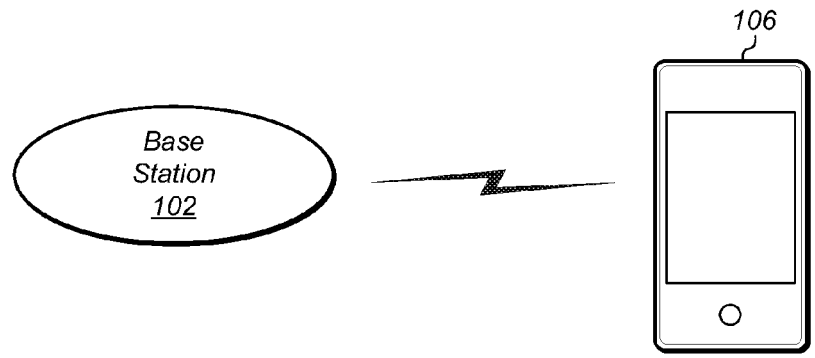
FIG. 2 illustrates an exemplary base station in communication with an exemplary user equipment device.

FIGS. 1-2—Communication System

FIG. 1 illustrates an exemplary (and simplified) wireless communication system. It is noted that the system of FIG. 1 is merely one example of a possible system, and embodiments may be implemented in any of various systems, as desired.

As shown, the exemplary wireless communication system includes base stations 102A, 102B, etc., through 102N which communicate over a transmission medium with one or more user devices 106A, 106B, etc., through 106N. Each of the user devices may be referred to herein as a "user equipment" (UE). Thus, the user devices are referred to as UEs or UE devices.

The base stations 102A-102N may be base transceiver stations (BTS) or cell sites, and may include hardware that enables wireless communication with the user devices 106A-106N. A base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100.

The base stations 102 and the user devices 106 may be configured to communicate over the transmission medium using any of various radio access technologies (RATs), also referred to as wireless communication technologies, or telecommunication standards, such as GSM, UMTS (WCDMA), LTE, LTE-Advanced (LTE-A), 3GPP2 CDMA2000 (e.g., 1xRTT, 1xEV-DO, HRPD, eHRPD), Wi-Fi, WiMAX etc.

Note that a UE 106 may also be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). The UE 106 might also or alternatively be configured to communicate using WLAN, Bluetooth, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

Base stations 102A-102N and other similar base stations operating according to the same or different cellular communication standards may thus be provided as one or more networks of cells, which may provide continuous or nearly continuous overlapping service to UE 106 and similar devices over a wide geographic area via one or more cellular communication standards.

UEs 106A-106N may be capable of communicating with any of base stations 102A-102N, possibly even if some of base stations 102A-102N operate according to different RATs. For example, UE 106A may communicate with base station 102A as its "serving" base station, and may also monitor signals from base stations 102B and 102N (and possibly any other nearby base stations), e.g., to ensure that the UE 106A is being provided with the best possible service. If it were to be determined that base station 102N might provide better service than base station 102A, the UE might perform a "handover" from the cell provided by base station 102A to the cell provided by base station 102N, such that the base station 102N would then be the serving base station for UE 106A. If base station 102N operates according to a different RAT than base station 102A, the handover may be an inter radio access technology (iRAT) handover.

Note also that if desired, some or all base stations may be capable of operating according to multiple radio access technologies. For example, a base station may be a multi-mode base station configured to operate (e.g., provide service) according to any one of multiple radio access technologies at any given time, or may even be configured to operate according to multiple radio access technologies simultaneously. As another possibility, multiple base stations which operate according to different RATs may be co-located; in other words, equipment providing cells according to each of multiple RATs may be located in close proximity to each other, such that the cells provided may substantially or entirely overlap.

FIG. 2 illustrates user equipment 106 (e.g., one of the devices 106A through 106N) in communication with a base station 102 (e.g., one of the base stations 106A through 106N). The UE 106 may be a device with wireless network connectivity such as a mobile phone, a hand-held device, a computer or a tablet, or virtually any type of wireless device.

The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein.

The UE 106 may be configured to communicate using any of multiple wireless communication protocols. For example, the UE 106 may be configured to communicate using two or more of GSM, UMTS, CDMA2000, LTE, LTE-A, WLAN, or GNSS. Other combinations of wireless communication standards are also possible.

The UE 106 may include one or more antennas for communicating using one or more wireless communication protocols. The UE 106 may share one or more parts of a receive and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As a further possibility, the UE 106 may include one or more radios which are shared between multiple wireless communication protocols, and one or more radios which are used exclusively by a single wireless communication protocol. For example, the UE 106 might include a shared radio for communicating using any of LTE, UMTS, or GSM, and separate radios for communicating using each of Wi-Fi and Bluetooth. As a still further possibility, the UE might include multiple receive and/or transmit RF chains capable of operating according to a single wireless communication protocol (or any of multiple wireless communication protocols), such as in order to implement carrier aggregation (e.g., in LTE) and/or dual carrier HSPA (DC-HSPA). Other configurations are also possible.

Figure 3:
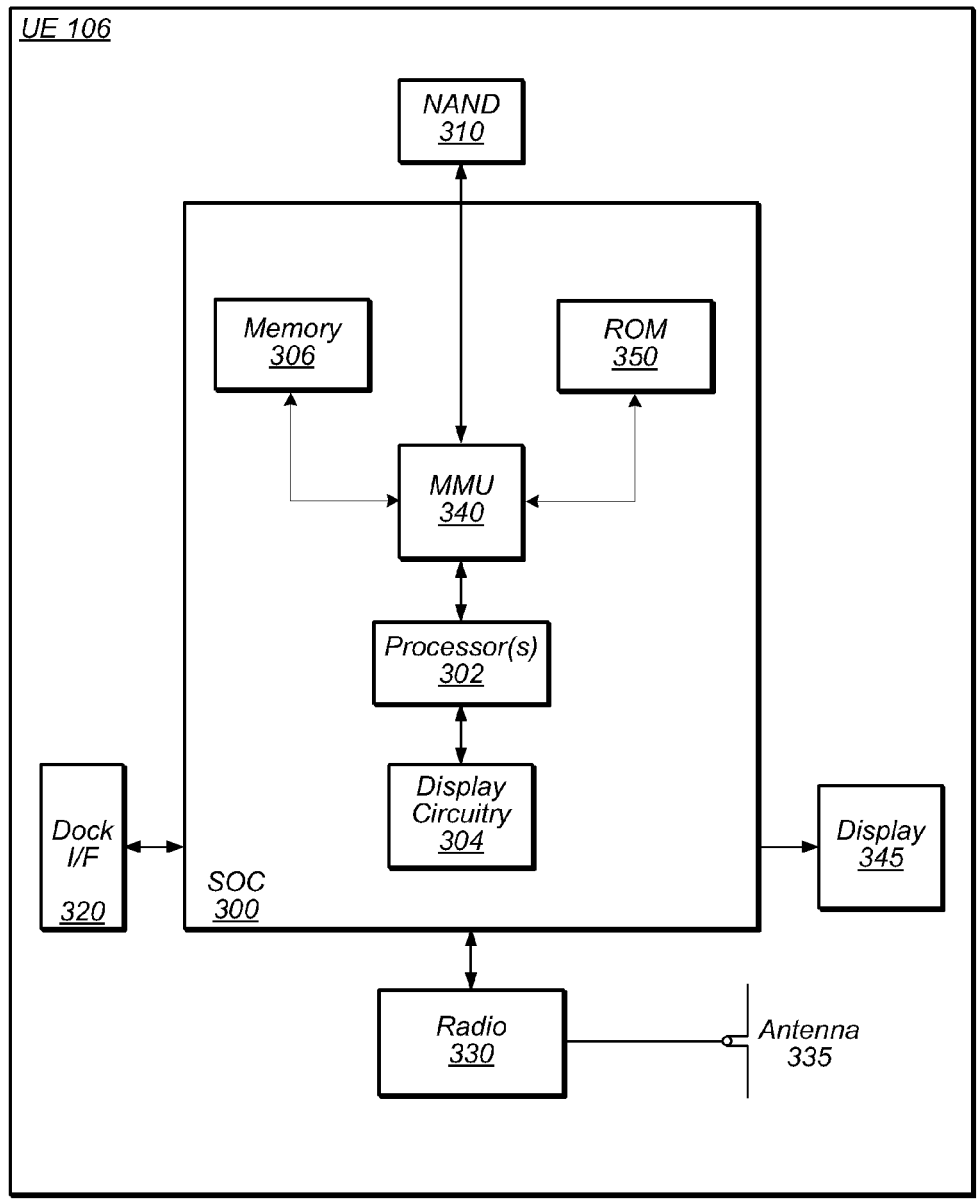
FIG. 3 illustrates an exemplary block diagram of a user equipment device.

FIG. 3—Exemplary Block Diagram of a UE

FIG. 3 illustrates an exemplary block diagram of a UE 106. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 345. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 345. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to a computer system, dock, charging station, etc.), the display 345, and wireless communication circuitry 330, also referred to as a radio (e.g., for UMTS, LTE, LTE-A, CDMA2000, Bluetooth, Wi-Fi, GPS, etc.).

The UE device 106 may include at least one antenna, and possibly multiple antennas, for performing wireless communication with base stations and/or other devices. For example, the UE device 106 may use antenna 335 to perform the wireless communication. As noted above, the UE may be configured to communicate wirelessly using multiple wireless communication standards.

The UE 106 may also include and/or be configured for use with one or more user interface elements. The user interface elements may include any of various elements, such as display 345 (which may be a touchscreen display), a keyboard (which may be a discrete keyboard or may be implemented as part of a touchscreen display), a mouse, a microphone and/or speakers, one or more cameras, one or more buttons, and/or any of various other elements capable of providing information to a user and/or receiving/interpreting user input.

As described further subsequently herein, the UE 106 may include hardware and software components for implementing features for estimating loading of a serving cell of the UE 106, such as those described herein with reference to, inter alia, FIG. 5. The processor 302 of the UE device 106 may be configured to implement part or all of the methods described herein, e.g., by executing program instructions stored on a memory medium (e.g., a non-transitory computer-readable memory medium). In other embodiments, processor 302 may be configured as a programmable hardware element, such as an FPGA (Field Programmable Gate Array), or as an ASIC (Application Specific Integrated Circuit). Alternatively (or in addition) the processor 302 of the UE device 106, in conjunction with one or more of the other components 300, 304, 306, 310, 320, 330, 335, 340, 345, 350 may be configured to implement part or all of the features described herein, such as the features described herein with reference to, inter alia, FIG. 5.

Figure 4:
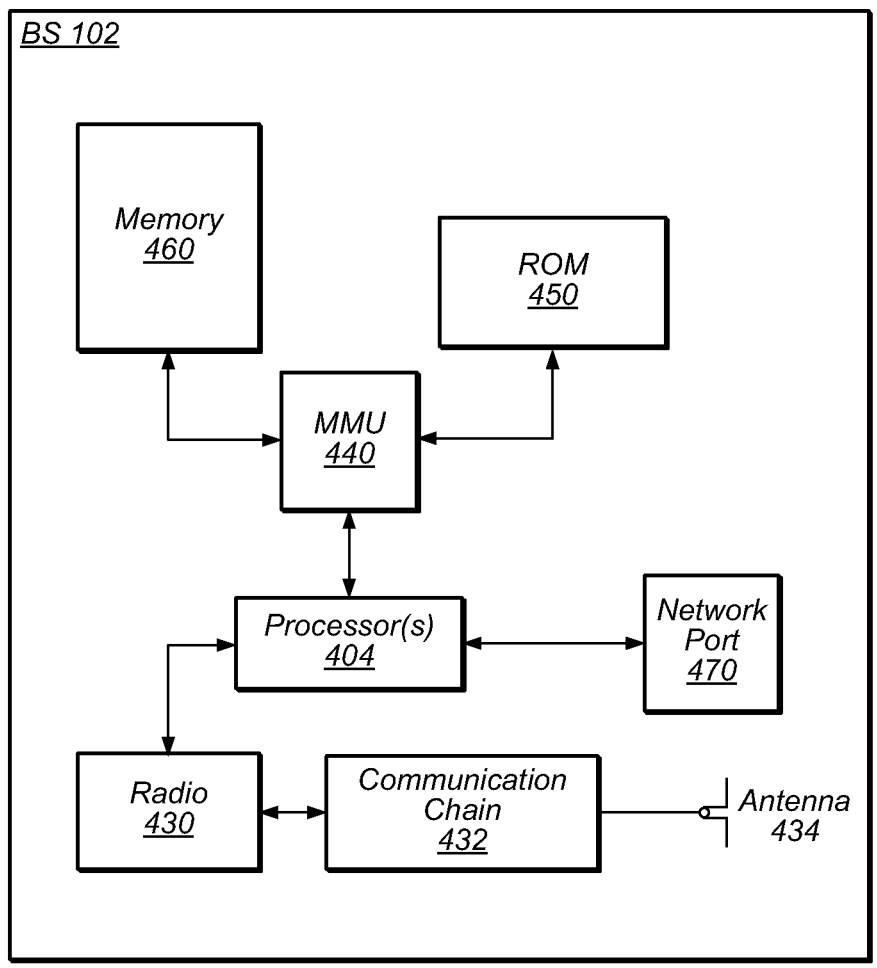
FIG. 4 illustrates an exemplary block diagram of a base station.

FIG. 4—Exemplary Block Diagram of a Base Station

FIG. 4 illustrates an exemplary block diagram of a base station (BS) 102. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2.

The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be configured to communicate via various wireless telecommunication standards, including, but not limited to, LTE, LTE-A, UMTS, CDMA2000, Wi-Fi, etc.

The base station 102 may be configured to communicate with a UE 106 in a manner that supports cell load/utilization estimation by the UE 106. In particular, as described further subsequently herein, the BS 102 may include hardware and software components for implementing (or for use in conjunction with a UE 106 implementing) part or all of a method for a UE to estimate serving cell load/utilization.

The processor 404 of the base station 102 may be configured to implement part or all of the methods described herein, e.g., by executing program instructions stored on a memory medium (e.g., a non-transitory computer-readable memory medium). Alternatively, the processor 404 may be configured as a programmable hardware element, such as an FPGA (Field Programmable Gate Array), or as an ASIC (Application Specific Integrated Circuit), or a combination thereof.

Figure 5:
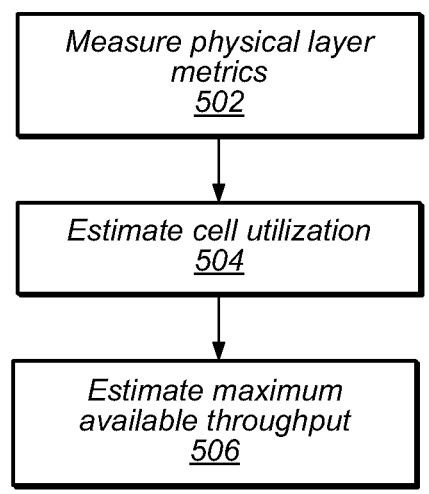
FIG. 5 is a flowchart diagram illustrating an exemplary method for estimating load and maximum available throughput of a serving cell by a user equipment device.

FIG. 5—Load Estimation Flowchart

FIG. 5 is a flowchart diagram illustrating a method a wireless user equipment (UE) device (such as UE 106 illustrated in and described with respect to FIGS. 1-3) to estimate utilization and loading of serving cell of the UE in a cellular network, and to estimate a maximum throughput available to the UE from the serving cell. The cellular network may operate according to any of various radio access technologies, including a 3GPP standard such as UMTS or LTE or a 3GPP2 standard such as CDMA2000, among various possibilities.

In 502, a UE 106 may measure one or more physical layer metrics relating to the serving cell. The physical layer metrics may correspond to a channel on which the UE 106 communicates with the serving cell, and may include any of a variety of metrics. In some instances, the physical layer metrics may include such metrics as total received power (e.g., received signal strength indicator or RSSI) of the channel, reference signal power (e.g., reference signal received power or RSRP), reference signal quality (e.g., reference signal received quality or RSRQ), signal to interference ratio (SIR), signal to noise ratio (SNR), and/or signal to interference plus noise ratio (SINR).

In 504, the UE 106 may estimate cell utilization of the serving cell. As used herein, "cell utilization" or "total cell utilization" may refer to the total utilization of cell resources (e.g., resource blocks) by all devices being served by a cell, including (if applicable) the UE 106. In other words, cell utilization may represent the fraction of total cell resources, which are currently allocated. For example, if a cell has 50 total resource blocks, and 40 of the resource blocks are currently allocated, the cell utilization would be 40/50 or 0.8. It will be recognized that these values are exemplary only, and that different numbers of total cell resource blocks, allocated cell resource blocks, and cell utilization ratios are also possible.

The cell utilization estimation may be performed based on the measured physical layer metrics. More particularly, the cell utilization estimation may utilize a formula which relates the measured physical layer metrics with total cell utilization according to the configuration of the UE 106 and according to the parameters of the radio access technology according to which the UE 106 communicates with the serving cell to solve for the total cell utilization of the serving cell. As one example, the formula may relate total received power and reference signal received power to total cell utilization and signal to interference plus noise ratio. Further exemplary details of possible formulae are provided herein below with respect to FIG. 7.

Note that in at least some instances, the physical layer metrics used for cell utilization estimation may be time-filtered (i.e., may undergo temporal filtering) over a certain (e.g., pre-determined) time window. For example, while the desired physical layer metrics might (according to some implementations) be periodically measured or sampled on a relatively frequent basis during the course of normal operation of the UE 106 to provide instantaneous measurement information for various purposes of the UE 106, values of the physical layer metrics which are averaged or filtered over a longer period of time (e.g., a period of time during which multiple measurements for each metric have been performed) may be used for the cell utilization estimation. Note also that if filtering is performed, it may (at least in some instances) be desirable (e.g., for consistent and meaningful results) for the filtering window to be the same for all physical layer metrics which are to be used for the cell utilization estimation. The time-window used may be any of a variety of windows, depending for example on the desired degree of smoothing/averaging of the cell utilization estimation. Some exemplary time-window values might include 40 ms, 50 ms, 100 ms, 150 ms, 200 ms, and/or any other value. Note additionally that if desired, the smoothing/filtering window may be dynamically adjustable, e.g., to account for different filtering windows being desired at different times and/or for different uses of the resulting cell utilization estimation (and/or any values generated/estimated based thereon).

Once total cell utilization has been estimated, the UE 106 may estimate the cell load of the serving cell based at least in part on the estimated total cell utilization. As used herein, "cell load" may refer to the total utilization of cell resources (e.g., resource blocks) by all devices being served by a cell, except (i.e., exclusive of) the UE 106 estimating the cell load. In other words, cell load (from the perspective of UE 106) may represent the fraction of total cell resources which are currently allocated to devices other than the UE 106.

Estimating the cell load of the serving cell may include subtracting the resource utilization ratio of the UE 106 from the total cell utilization. For example, continuing the previously provided example, if a cell has 50 total resource blocks, a cell utilization of 0.8, and 2 of the resource blocks are currently allocated to the UE 106, the cell load would be 0.8−(2/50)=0.76. It will be recognized that these values are exemplary only, and that different numbers of total cell resource blocks, allocated cell resource blocks, cell utilization ratios, and cell load ratios are also possible. Note that in the case the UE 106 has not been allocated any resources by the serving cell during the time window of the temporal averaging, the cell load would be equal to the cell utilization.

Note that if the cell utilization is estimated using time-filtered physical layer metrics, the resource utilization ratio of the UE 106 used to estimate the cell load of the serving cell may also be time-filtered in the same manner/using the same filtering window, e.g., in order to provide a consistent and meaningful result.

Using the estimated cell load, the UE 106 may be capable of determining the maximum number of resource blocks which may be expected to be available to the UE 106 from the serving cell. For example, if (as in the above example) the serving cell has a cell load of 0.76 and 50 total resource blocks, the UE 106 may estimate that there may be up to 12 (i.e., (1−0.76)*50) resource blocks available to the UE 106.

In 506, a maximum available throughput of the serving cell may be estimated, based at least in part on the estimated cell utilization and/or cell load. While the maximum number of resource blocks which may be expected to be available to the UE 106 from the serving cell may form one aspect of the maximum available throughput available to the UE 106, the available throughput may also depend on a modulation and coding scheme (MCS) used in accordance with those resource blocks.

For example, in LTE, a UE 106 may periodically (or aperiodically) generate channel quality indicator (CQI) information (e.g., based on SINR and/or various other measurements) for the channel on which the UE 106 communicates with the serving cell and transmit a CQI report containing such information to the base station providing the serving cell. The base station may in turn map a CQI index received in the CQI report to an MCS to be used for communication with the UE 106.

The mapping between the CQI and the MCS may be predictable and known by the UE 106, at least in some instances. Accordingly, the UE 106 may be capable of estimating an expected MCS. Once such an expected MCS has been determined, the UE 106 may use this information in combination with the maximum number of resource blocks which may be expected to be available to the UE 106 from the serving cell to calculate a maximum possible transport block size for the UE 106 (e.g., using the transport block size table in TS 36.213 section 7.1.7, according to LTE), which may function as a relatively accurate estimation of the maximum (possibly long term, e.g., if filtered) expected available throughput of the serving cell.

Note that the cell utilization, cell load, and/or maximum available throughput estimation(s) may be performed in response to a trigger. The trigger may be a periodic or an aperiodic event. For example, as one possibility, the UE 106 may maintain a periodic load estimation timer. At the expiration of the timer, the UE 106 may be triggered to perform load estimation (e.g., including utilization estimation) of the serving cell, and possibly also maximum available throughput estimation. As another possibility, a physical layer load estimation functional block of the UE 106 may be capable of receiving a load estimation trigger in an event based manner. The event-based trigger might be received from another block of the physical layer, or from another layer, such as an application layer. For example, an application (such as a media streaming application) at the application layer might request that load estimation be performed (thus providing the trigger) in order to determine if sufficient throughput would be available for the application (or an action which might be taken by the application, such as establishing a particular media stream).

Thus, a UE 106 may be able to estimate loading of a cell relatively accurately using physical layer metrics, which may (at least in some instances) already be measured by the UE 106. This may enable the UE 106 to perform various optimizations with respect to its operation (e.g., based on more accurate performance expectations) based on application profile and performance requirements (e.g., throughput, quality of service, battery). For example, certain network-dependent applications (e.g., video chatting applications) might modify their scheduling or other behaviors to improve performance depending on the loading of the cell, given an estimate of the loading of the cell.

Additionally, providing a UE 106 with the capability to estimate cell load and maximum available throughput of its serving cell may support network connection related decision-making by the UE 106; for example, the UE 106 may be able to determine whether networking (e.g., throughput) needs/requests may reasonably be expected to be met by the serving cell, and if not, to facilitate determining whether to re-select to a different serving cell, add a secondary component carrier (i.e., utilize carrier aggregation to provide additional throughput), utilize a different wireless communication technology (e.g., Wi-Fi and/or a different cellular communication technology) to provide an alternative or additional network connection, deny or delay one or more networking requests (e.g., from an application for which insufficient throughput would be available to provide an acceptable user experience), or perform any of a variety of other network connection management related actions.

Figure 6:
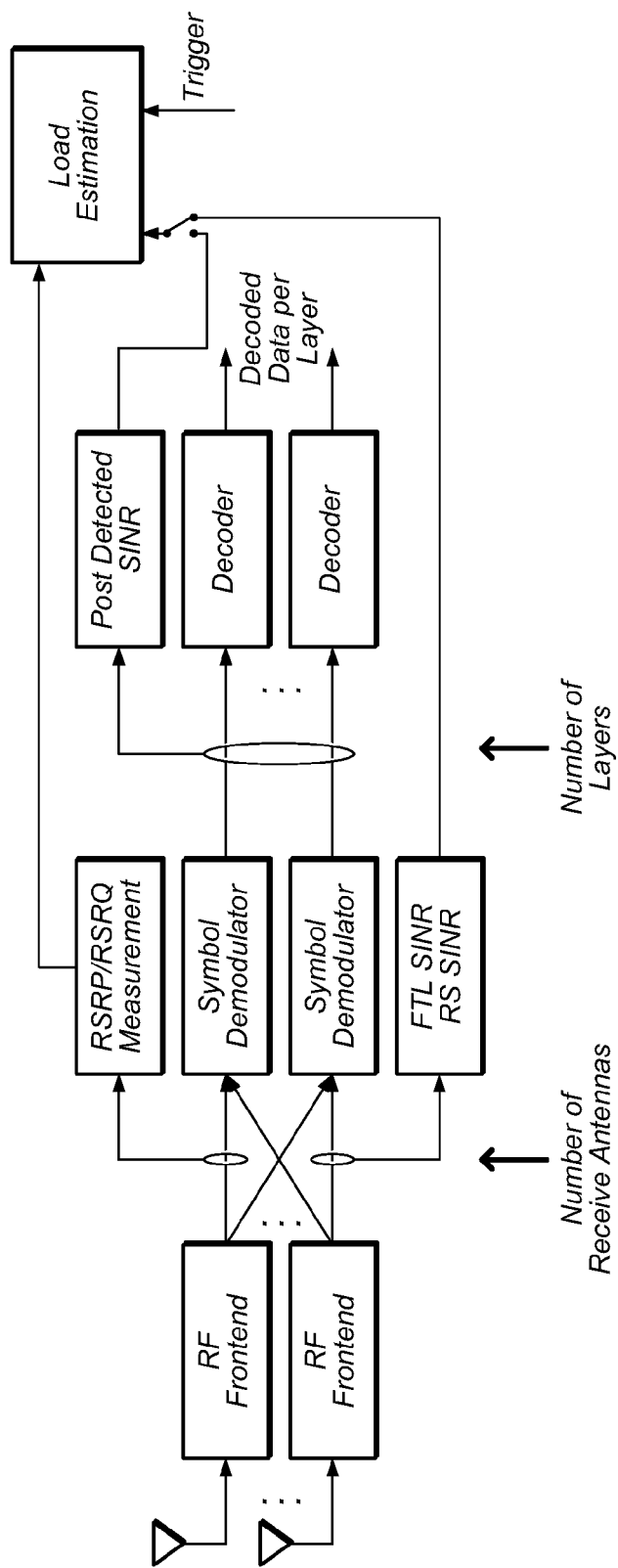
FIG. 6 illustrates an exemplary PHY architecture of a user equipment device.

FIG. 6—Exemplary PHY Architecture

FIG. 6 illustrates one example of a possible PHY architecture of a UE 106 in which the method of FIG. 5 may be implemented. Note that FIG. 6 and the description thereof are provided by way of example of one possible PHY layer architecture, and are not intended to be limiting to the disclosure as a whole. Numerous alternatives to and variations of the details provided herein below are possible and should be considered within the scope of the present disclosure.

As shown, the UE 106 may include multiple antennas and RF frontends (receive chains). Signals received via the receive chains may be provided to symbol demodulators, and thence to decoders, from which decoded data may be provided to upper layers.

In addition to signal decoding, various measurements may be taken on the signals from various points. For example, as shown, RSRP and RSRQ measurements (which may include RSSI measurements, in some instances) may be taken from one antenna port after passing through the RF frontend for that antenna port. FTL SINR and RS SINR may be taken from another antenna port after passing through the RF frontend for that antenna port. Additionally, post detected SINR may be taken (possibly from the same antenna port as RSRP and RSRQ measurements are taken) after symbol demodulation has occurred.

A load estimation module may be coupled to and receive input from the RSRP/RSRQ measurement module and the post detected SINR module and/or the FTL SINR and RS SINR module (e.g., depending on availability). Upon receiving a trigger (e.g., an event based or periodic/timer based trigger, such as described previously herein), the load estimation module may perform load estimation of the serving cell, and may possibly also estimate maximum available throughput of the serving cell, such as in the manner described hereinabove with respect to FIG. 5. The load estimation module may provide the results of such calculations to another PHY layer module and/or to another layer (not shown), as desired.

Figure 7:
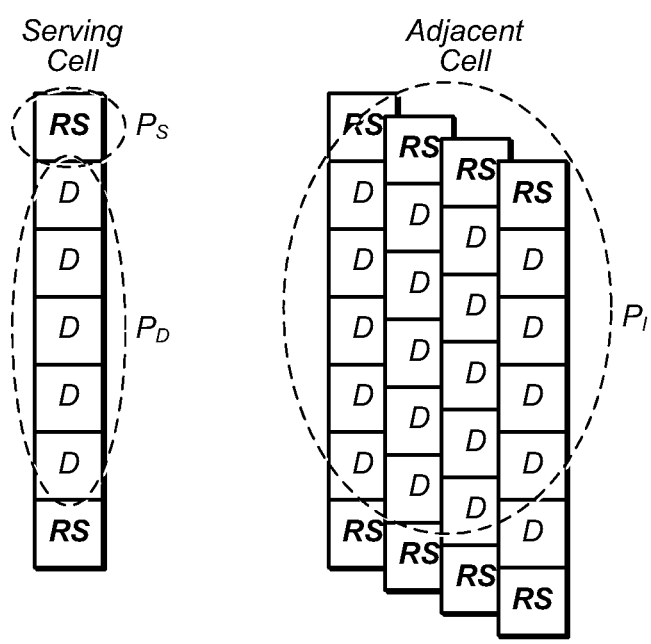
FIG. 7 illustrates aspects of one exemplary possible LTE system.

FIG. 7—Exemplary LTE System and Cell Utilization Formulae

FIG. 7 illustrates aspects of one exemplary possible LTE system according to which a UE 106 implementing the method of FIG. 5 may operate. Note that FIG. 7 and the description thereof are provided by way of example of one possible cellular system, and are not intended to be limiting to the disclosure as a whole. Numerous alternatives to and variations of the details provided herein below are possible and should be considered within the scope of the present disclosure.

In the system of FIG. 7, each of a serving cell and any number of adjacent cells to the UE 106 may be within communication range of the UE 106. Each cell may provide reference (pilot) subcarriers as well as data subcarriers; according to the system of FIG. 7, five data subcarriers may be provided for each reference subcarrier.

The signals received by a UE 106 in such a system may be considered according to their constituent components. In particular, as illustrated in FIG. 7, the signal power associated with the reference signal provided by the serving cell may be referred to as $P_S$, while the signal power associated with the data signals provided by the serving cell may be referred to as $P_D$; the signal power associated with interference signals (such as signals from the adjacent cells) may be referred to as $P_I$.

Conceptually, it can be seen that in the system illustrated in FIG. 7, total cell utilization ("α") may be represented as:

$$\alpha = \frac{P_D}{5 * P_S},$$

under the assumption that Pa/Pb (representing the reference signal to data signal power boost) is equal to one, since there are five data subcarriers for each pilot subcarrier of the serving cell.

Similarly, it can be seen that that in the system illustrated in FIG. 7, signal to interference plus noise ratio ("γ") may be represented as:

$$\gamma = \frac{6 * P_S}{P_I},$$

Since there may be six interference subcarriers for each pilot subcarrier of the serving cell. Note that if Pa/Pb is not equal to one, α and γ may be formulated similarly but using an appropriate scaling factor in accordance with the Pa/Pb ratio.

As defined according to 3GPP specification documents, the physical layer metrics RSRQ, RSRP, and RSSI may be related as follows:

$$RSRQ = N \frac{RSRP}{RSSI},$$

or equivalently, $$\frac{1}{RSRQ} = \frac{RSSI}{N * RSRP}.$$

Given above-described framework and under the assumption that RSRP is computed on only one antenna port of two antenna ports (i.e., per half resource block, where one resource block is formed by 12 subcarriers in the frequency domain), and also assuming SINR and RSRP are filtered using the same window, the above equation may be reformulated as follows:

$$\frac{RSSI}{N*RSRP} = 2\frac{P_S + P_D + P_I}{P_S} = 2\left(1 + 5\alpha + \frac{6}{\gamma}\right)$$

Note that the accuracy of the result of this formula may depend on the accuracy of the estimation of SINR and RSRP/RSRQ. Accordingly, if desired, a correction factor may be added to the above formula to correct for the estimation error. This estimation error depend on (i.e., be a function of) the SINR. For example, the estimation error may be higher at lower SINR values because of an increased difficulty in achieving high estimation accuracy for such lower SINR values. Thus, a modified version of the above formula which includes such a correction factor may be formulated as follows:

$$\frac{RSSI}{N*RSRP} = 2\frac{P_S + P_D + P_I}{P_S} = 2\left(1 + 5\alpha + \frac{6}{\gamma\beta}\right),$$

where $$\beta = f(SINR) > 0$$

Note that if RSRP is computed on multiple antenna ports, a similar formula may be used, but a scaling factor may be introduced to account for the RSRP measurement technique used.

Thus, according to the above formula(s), a UE 106 may be able to solve for α using available (e.g., recently measured and possibly filtered) RSSI, RSRP, and SINR values for the serving cell as well as knowledge of the resource block allocation of the UE 106.

Embodiments of the present disclosure may be realized in any of various forms. For example some embodiments may be realized as a computer-implemented method, a computer-readable memory medium, or a computer system. Other embodiments may be realized using one or more custom-designed hardware devices such as ASICs. Still other embodiments may be realized using one or more programmable hardware elements such as FPGAs.

In some embodiments, a non-transitory computer-readable memory medium may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a computer system may be configured to include a processor (or a set of processors) and a memory medium, where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The computer system may be realized in any of various forms. For example, the computer system may be a personal computer (in any of its various realizations), a workstation, a computer on a card, an application-specific computer in a box, a server computer, a client computer, a hand-held device, a user equipment (UE), a tablet computer, a wearable computer, etc.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A method for operating a wireless user equipment (UE) device, the method comprising:
measuring a received signal strength indicator (RSSI), reference signal received power (RSRP), and signal to interference plus noise ratio (SINR) of a channel on which the UE communicates with a serving cell according to LTE;
calculating cell utilization of the serving cell based at least in part on the measured RSRP and SINR; and
calculating a maximum available throughput of the serving cell based at least in part on the calculated cell utilization.

2. The method of claim 1, further comprising:
calculating cell load of the serving cell by subtracting a current resource block utilization of the UE from the calculated cell utilization,
wherein calculating the maximum available throughput of the serving cell is based at least in part on the calculated cell load.

3. The method of claim 1, further comprising:
time-filtering the measured RSSI, RSRP and SINR,
wherein calculating cell utilization of the serving cell is based on the time-filtered RSRP and SINR.

4. The method of claim 1,
wherein said calculating the cell utilization and calculating the maximum available throughput of the serving cell are performed at predetermined periodic intervals.

5. The method of claim 1,
wherein said calculating the cell utilization and calculating the maximum available throughput of the serving cell are performed in response to an aperiodic event.

6. The method of claim 1,
wherein calculating the maximum available throughput of the serving cell is further based on comparing the SINR and channel quality indicator (CQI) information to a transport block size (TBS) table.

7. The method of claim 1, wherein the UE communicates with the serving cell according to an LTE communication system in which five data subcarriers are provided for every pilot subcarrier, wherein RSRP is computed on a single antenna port of the UE, wherein reference signal to data signal power ratio is 1 according to the LTE communication system, wherein calculating cell utilization of the serving cell based at least in part on the measured RSRP and SINR comprises utilizing the following formula to solve for total cell utilization:

$$\frac{RSSI}{N*RSRP} = 2\frac{P_S + P_D + P_I}{P_S} = 2\left(1 + 5\alpha + \frac{6}{\gamma}\right)$$

wherein N represents a number of resource blocks allocated to the UE, wherein $P_S$ represents reference signal power, wherein $P_D$ represents data signal power and is computed per half resource block, wherein $P_I$ represents interference signal power and is computed per half resource block, wherein α represents total cell utilization and is equivalent to $P_D/P_S$ according to the LTE communication system, wherein γ represents SINR and is equivalent to $6P_S/P_I$ according to the LTE communication system.

8. A wireless user equipment (UE) device, the UE comprising:
a radio, comprising one or more antennas configured for wireless communication; and
a processing element operatively coupled to the radio;
wherein the radio and the processing element are configured to:
measure a plurality of physical layer metrics according to a cellular communication technology;
receive an indication to estimate load on a serving cell of the UE;
filter the plurality of physical layer metrics over a predetermined period of time based on the indication to estimate load on the serving cell;
estimate a time-averaged total cell utilization of the serving cell based at least in part on the filtered plurality of physical layer metrics; and
subtract a time-averaged serving cell resource utilization by the UE from the time-averaged total cell utilization of the serving cell to estimate a time-averaged cell load of the serving cell exclusive of serving cell resource utilization by the UE.

9. The UE of claim 8, wherein the radio and the processing element are further configured to:
estimate a maximum available throughput of the serving cell based at least in part on the estimated time-averaged cell load of the serving cell exclusive of serving cell resource utilization by the UE.

10. The UE of claim 9, wherein to estimate the maximum available throughput of the serving cell, the radio and the processing element are further configured to:
compare channel quality indicator information for the UE with a transport block size table according to the cellular communication technology to determine the estimated maximum available throughput of the serving cell.

11. The UE of claim 8,
wherein the indication to estimate load on a serving cell of the UE comprises expiration of a periodic load estimation timer.

12. The UE of claim 8,
wherein the plurality of physical layer metrics comprise:
received signal strength indicator (RSSI);
reference signal received power (RSRP); and
signal to interference plus noise ratio (SINR).

13. The UE of claim 8,
wherein the cellular communication technology is LTE.

14. A non-transitory computer accessible memory medium comprising program instructions which, when executed at a wireless user equipment (UE) device, cause the UE device to implement a method for estimating loading of a serving cell of the UE in an LTE cellular network, comprising:
measuring a plurality of physical layer metrics of a channel according to which the UE communicates with the serving cell;
estimating total cell utilization of the serving cell based on the measured physical layer metrics; and
estimating a maximum available throughput of the serving cell based at least in part on the estimated total cell utilization.

15. The memory medium of claim 14, wherein estimating total cell utilization of the serving cell based on the measured physical layer metrics comprises:
utilizing a formula relating total received power, reference signal received power, and a number of resource blocks allocated to the UE to total cell utilization and signal to interference plus noise ratio based on UE configuration and according to parameters of the LTE cellular system to solve for the total cell utilization.

16. The memory medium of claim 14, wherein when the method implemented as a result of executing the program instructions further comprises:
maintaining a periodic load estimation timer, wherein expiration of the periodic load estimation timer provides a trigger initiating estimating the total cell utilization of the serving cell and estimating the maximum available throughput of the serving cell.

17. The memory medium of claim 14, wherein when the method implemented as a result of executing the program instructions further comprises:
estimating loading of the serving cell exclusive of the UE, comprising removing cell utilization by the UE from the total cell utilization of the serving cell,
wherein estimating the maximum available throughput of the serving cell is based at least in part on the estimated loading of the serving cell exclusive of the UE.

18. The memory medium of claim 14, wherein when the method implemented as a result of executing the program instructions further comprises:
performing temporal filtering of the plurality of physical layer metrics,
wherein estimating total cell utilization of the serving cell is based on the temporally filtered physical layer metrics.

19. The memory medium of claim 14,
wherein estimating the maximum available throughput of the serving cell is further based at least in part on identifying a maximum expected throughput of the UE based on channel conditions observed by the UE using channel quality indicator information for the UE in combination with a transport block size table used by the LTE cellular network.

20. The memory medium of claim 14,
wherein the plurality of physical layer metrics comprise two or more of:
received signal strength indicator (RSSI);
reference signal received power (RSRP);
reference signal received quality (RSRQ) and
signal to interference plus noise ratio (SINR).

* * * * *

UNITED STATES PATENT AND TRADEMARK OFFICE
CERTIFICATE OF CORRECTION

PATENT NO. : 9,179,355 B2  
APPLICATION NO. : 14/150928  
DATED : November 3, 2015  
INVENTOR(S) : Tarik Tabet et al.

Page 1 of 1

It is certified that error appears in the above-identified patent and that said Letters Patent is hereby corrected as shown below:

In the claims:

Claim 7, Column 15, Line 9, please delete "$P_D/P_S$" and substitute -- $P_D/5P_S$ --

Signed and Sealed this
Twelfth Day of July, 2016

Michelle K. Lee
*Director of the United States Patent and Trademark Office*